United States Patent
Yuan

(10) Patent No.: US 10,731,967 B2
(45) Date of Patent: Aug. 4, 2020

(54) SYSTEM FOR QUICKLY DETECTING TUNNEL DEFORMATION

(71) Applicant: TONGJI UNIVERSITY, Shanghai (CN)

(72) Inventor: Yong Yuan, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 343 days.

(21) Appl. No.: 15/787,259
(22) Filed: Oct. 18, 2017

(65) Prior Publication Data

US 2018/0038683 A1 Feb. 8, 2018

Related U.S. Application Data

(63) Continuation of application No. PCT/CN2016/077854, filed on Mar. 30, 2016.

(30) Foreign Application Priority Data

Dec. 25, 2015 (CN) .......................... 2015 1 0992813

(51) Int. Cl.
*G01C 3/08* (2006.01)
*G01B 11/16* (2006.01)
(Continued)

(52) U.S. Cl.
CPC ............ *G01B 11/16* (2013.01); *G01B 11/002* (2013.01); *G01C 7/06* (2013.01); *G01C 15/002* (2013.01)

(58) Field of Classification Search
CPC ........ G01B 11/16; G01B 11/002; G01C 7/06; G01C 15/002
(Continued)

(56) References Cited

U.S. PATENT DOCUMENTS 4,930,595 A * 6/1990 Hayward ............... E21B 47/022
181/104
5,274,437 A * 12/1993 Hornyik ................... G01C 7/06
356/606
(Continued)

FOREIGN PATENT DOCUMENTS

CN 102538763 A 7/2012
CN 102768022 A 11/2012
(Continued)

OTHER PUBLICATIONS

International Search Report (Chinese and English) and Written Opinion of PCT/CN2016/077854 dated Sep. 20, 2016.

*Primary Examiner* — Mark Hellner
(74) *Attorney, Agent, or Firm* — Hamre, Schumann, Mueller & Larson, P.C.

(57) ABSTRACT

The present invention relates to a system for quickly detecting tunnel deformation, comprising a rail walking mechanism (1) disposed on a subway rail, and an acquisition system (2) disposed on the rail walking mechanism (1); wherein the rail walking mechanism (1) is a T-shaped walking platform, comprising a cross shaft (11), a longitudinal shaft (12) and a stand column (13); the cross shaft (11) and the longitudinal shaft (12) are connected to form the T-shaped platform; tread wheels (16) are disposed at the bottom of the T-shaped platform; one end of the stand column (13) is vertically connected with the cross shaft (11), and the other end of the stand column is used for configuring an operating platform (14) of the acquisition system (2); the acquisition system (2) comprises a fractional laser structured light source (21), industrial focus-fixed cameras (22) and a computer; and the computer is connected with the industrial focus-fixed cameras (22). Compared with the prior art, the quick detection device can effectively solve the problem of detecting cross section deformation of tunnels, the problem of transforming many different local coordinate systems to a global coordinate system, and the problem of unstable test data caused by movements.

8 Claims, 4 Drawing Sheets

(51) Int. Cl.
*G01C 7/06* (2006.01)
*G01B 11/00* (2006.01)
*G01C 15/00* (2006.01)

(58) Field of Classification Search
USPC ........................................................ 356/3.03
See application file for complete search history.

(56) References Cited

U.S. PATENT DOCUMENTS 7,599,050 B2 * 10/2009 Ishikawa ................ G01N 21/94
356/237.2
2006/0221072 A1 * 10/2006 Se .......................... G01C 11/06
345/420

FOREIGN PATENT DOCUMENTS

| | | |
|---|---|---|
| CN | 104237257 A | 12/2014 |
| CN | 204116247 U | 1/2015 |
| CN | 104567708 A | 4/2015 |
| CN | 104792790 A | 7/2015 |
| CN | 204495733 U | 7/2015 |
| CN | 105423940 A | 3/2016 |
| CN | 205448985 U | 8/2016 |
| JP | H0672774 B2 | 9/1994 |
| KR | 101308987 B1 | 10/2013 |

* cited by examiner

SYSTEM FOR QUICKLY DETECTING TUNNEL DEFORMATION

BACKGROUND OF THE INVENTION

Technical Field

The present invention is related to the technical field of civil engineering, specifically to a quick measurement system of cross section deformation of a subway tunnel structure, in particular to a system for quickly detecting tunnel deformation, which uses fractional laser as an auxiliary structured light source.

Description of the Related Art

When in use, cross sectional deformation in subway tunnels is an inevitable hazard and this hazard can cause invertible negative effects to the tunnel safety over time. Therefore, the maintenance of the tunnel structure during the subway operations is regarded as a necessary means for guaranteeing the long-term operational safety of the tunnels. The tunnel hazard detection is the basis of the decision-making for tunnel maintenance and the execution of the technical means.

Traditionally, a total-station instrument method is usually employed to detect the cross section deformation of the tunnel structure. In actual operations, total-station instruments are installed and leveled manually, and then the measurement begins. About 25 minutes are needed to complete the measurement of one cross section deformation of the tunnel structure. Therefore, in subway tunnels, usually the test is carried out on every five cross sections each time. With only 2 hour intervals between subway operations each day, the measurement efficiency is extremely low. The total-station instrument method can only meet the needs of detecting the cross section deformation of short-distance projects, and fails to cope with long-distance projects. Even with the participation of massive personnel and equipment, more than half a year is needed to complete one cycle of the testing of the whole subway network. Such method cannot meet the demands of ensuring the operational safety of the future subway network.

In recent years, more and more attention has been paid to the maintenance of the tunnel structures around the world, and tunnel testing devices based on different technical principles have been developed. AMBERG, a Swiss company, has developed GRR5000 and TunnelMap series tunnel testing systems. The systems adopt vehicle-mounted laser scanners to test the tunnels and can obtain images of the cross section deformation of tunnels. But since the resulting files have a vast capacity and cannot give geometric parameters of cross section deformation, manual reading and judging are needed. SPACETEC, a German company, has developed a SPACETEC TS3 quick tunnel scanning and testing system. According to the promotional materials of this company, the SPACETEC TS3 system can be installed in any testing vehicle to test the lining water seepage of tunnels. Researchers from Berg Bygg Konsult (BBK) AB, a Swedish company, utilize a three-dimensional ground laser scanning system to test the water leakage and seepage of tunnels. HGH, a French infrared system company, has developed an ATLAS 70 multi-sensor tunnel non-destructive testing system which can also measure the water seepage of the tunnels. Tongji University in Shanghai China has developed a device for quick detection of comprehensive hazards of subway tunnel structures in operations (Chinese Patent Application No. 201410495172.0, Chinese Patent Application No. 201420554338.7); the device can detect the hazards of water leakage and seepage and the cross-section deformation, where the detection of the cross-section deformation is implemented by the combined usage of an annular single-line laser, serving as a structured light source, and multiple cameras. However, the geometric parameters of each annular cross section deformation obtained by the device are individual, independent and relative, failing to form a correlated coordinate system. From the whole working process of the device, the movement conditions have impact on the results.

Generally speaking, testing equipment are not only very expensive, but also have incomplete functions and low cost-performance.

BRIEF SUMMARY OF THE INVENTION

The objective of the disclosure is to provide a system for quickly detecting tunnel deformation to overcome the defects of the existing devices in the prior art, to effectively solve the problem of mutual interference of testing data of cross section deformation and the problem of unstable test data caused by movements.

The objective of the present invention can be fulfilled by the following technical solution:

System for quickly detecting tunnel deformation includes:

a rail walking mechanism, disposed on a subway rail;

an acquisition system, installed on the rail walking mechanism;

the rail walking mechanism is a T-shaped walking platform, comprising a cross shaft, a longitudinal shaft and a supporting column; the cross shaft and the longitudinal shaft are connected to form the T-shaped platform; a tread wheel is disposed at the bottom of the T-shaped platform; one end of the stand column is vertically connected with the cross shaft, and the other end of the stand column is used for setting an operating platform of the acquisition system;

the acquisition system comprises a fractional laser structured light source, industrial focus-fixed cameras and a computer, and the computer is connected with the industrial focus-fixed cameras;

when the rail walking mechanism moves forward along a subway rail, the industrial focus-fixed cameras acquire imaging data of the subway rail with the lighting of the fractional laser structured light source and then transmit the imaging data to the computer; and the computer receives and processes the imaging data to obtain the deformation of the cross sections of the subway tunnel structure.

The cross shaft and the longitudinal shaft are connected through a sliding chute to form the T-shaped platform and the cross shaft and the upper surface of the longitudinal shaft are on the same plane.

The upper surfaces of the three ends of the T-shaped platform are respectively provided with correlated coordinate marks for establishing a correlated coordinate plane.

The structured light source is generated from a fractional laser device.

During processing of the imaging data to obtain the deformation of the cross sections of the subway tunnel structure, coordinate transformation is implemented in the following way:

the fractional laser structured light source and the industrial focus-fixed cameras work together to construct a partial three-dimensional coordinate system of the cross section deformation of the subway tunnel structure; the rail walking mechanism and the correlated coordinate marks thereon cooperate to construct a correlated coordinate system; points in the partial three-dimensional coordinate system are transformed into a global three-dimensional coordinate system by the correlated coordinate system; and the deformation of cross sections of the subway tunnel structure is tested in the global three-dimensional coordinate system.

The acquisition system also includes an annular support frame, a control card, a power supply, a data exchanger and an encoder; the annular support frame is disposed on the operating platform. The fractional laser structured light source, the industrial focus-fixed cameras and the control card are fixed to the annular support frame. The power supply and the encoder are disposed in the cross shaft. The power supply is respectively connected with the encoder, the industrial focus-fixed cameras, the control card and the data exchanger. The control card is respectively connected with the encoder and the industrial focus-fixed cameras; and the industrial focus-fixed cameras are connected with the computer via the data exchanger;

The control card activates the industrial focus-fixed cameras according to the electronic pulses of the encoder. The cameras acquire the imaging data of the subway rail with the lighting of the fractional laser structured light source. The data exchanger transmits the acquired imaging data to the computer.

A plurality of industrial focus-fixed cameras are disposed, arrayed in turn along the annular edge of the annular support frame; and the fixing positions of the industrial focus-fixed cameras correspond to the annular angles of the image information, photographed by the industrial focus-fixed cameras in the tunnel.

The cross shaft is equipped with a groove for placing the power supply and the encoder. The power cords of the power supply and signal wires of the encoder are hidden in the groove and in the stand column.

The stand column is connected with the cross shaft via an inserting slot; and the annular support frame is connected with the operating platform via the inserting slot.

The cross shaft is equipped with a push handle.

Comparing to the prior art, the present invention has the following beneficial effects:

(1) The quick detection device of the present invention completes the photographing of cross section deformation testing indicators through a movement-activated testing device on the vehicle-mounted platform, calculates and analyzes the cross section deformation through special processing software developed for the device of the present invention. The deformation information of a single cross section, which is represented by three-dimensional coordinates, can be obtained in each cycle including photographing, calculation and analysis. The deformation information of the single cross section is represented by a partial coordinate system which is generated by the industrial focus-fixed cameras and the fractional laser structured light source. The deformation information of the single cross section is transformed to the global coordinate system (usually the ground coordinate system) through the correlated coordinate plane which is formed by coordinate correlation marks on the T-shaped rail walking platform. The transformation relationship among the local coordinate system, which is generated by the industrial focus-fixed cameras and the fractional laser structured light source, the correlated coordinate plane, which is formed by coordinate correlation marks, and the global coordinate system (usually the ground coordinate system) can be obtained by marking. The testing device of the present invention can greatly improve the testing speed of the cross section deformation of the subway tunnel structures at its operation and the data processing speed, not only solving the problems of low manual efficiency and long information feedback cycle, but also solving the problem that relative deformation of the cross sections cannot be compared. The device of the present invention provides a new testing technology for hazard measurement of subway tunnel structures, and effectively guarantees the decision-making speed of the subway operations and maintenance, and safety of the subway structures.

(2) The quick detection device of the present invention establishes the local three-dimensional coordinate system of the cross section deformation of the subway tunnel structure by using the industrial focus-fixed cameras and the fractional laser structured light source, and establishes the correlated coordinate plane by using the T-shaped rail walking platform and the correlated coordinate marks disposed on the surface of the T-shaped rail walking platform, thus solving the problem of mutual interference of the testing data of the cross section deformation. The device also transforms the cross section deformation information to the global coordinate system (usually the ground coordinate system) through the correlated coordinate plane. Meanwhile, the testing data of the cross section deformation can get out of the movement state in the three-dimensional coordinate system, thus solving the problem of unstable testing data caused by the movement.

(3) In the present invention, the T-shaped rail waking platform is invented, having three tread wheels to ensure three points in contact with the rail, thus when the walking platform is moving, the three points do not separate from the rail. Comparing with the widely used "H" shaped rail walking platform, when the four contact points of "H" shaped platform is moving, it is possible that one of the wheels is not in contact with the rails and geometrically, four points may be not on the same plane, so it is difficult to realize the transformation of the coordinate system. The "T" shape can ensure that the three points which are in contact with the rail must be on the same plane because, geometrically, the three points define a plane, so that the "T" shape is the optimum means for realizing the transformation of the coordinate system of the device.

(4) The quick detection device of the present invention adopts the fractional laser device as the structured light source, capable of better acquiring the imaging data in the subway tunnels to improve the accuracy of deformation testing.

Numbers in the Figures: 1. rail walking mechanism; 2. acquisition system; 11. cross shaft; 12. longitudinal shaft; 13. stand column; 14. operating platform; 15. correlated coordinate mark; 16. tread wheel; 17. push handle; 18. groove; 21. fractional laser structured light source; 22.

industrial focus-fixed camera; 23. annular support frame; 24. control card; 25. power supply; 26. data exchanger.

DETAILED DESCRIPTION OF THE INVENTION

The present invention is described in detail with reference to the attached drawings and embodiment. The embodiment, implemented on the premise of the technical solution of the present invention, provides the detailed implementation means and the specific operating process on the basis of this technical solution, but the protective scope of the present invention is not limited to the following embodiment.

Figure 1:
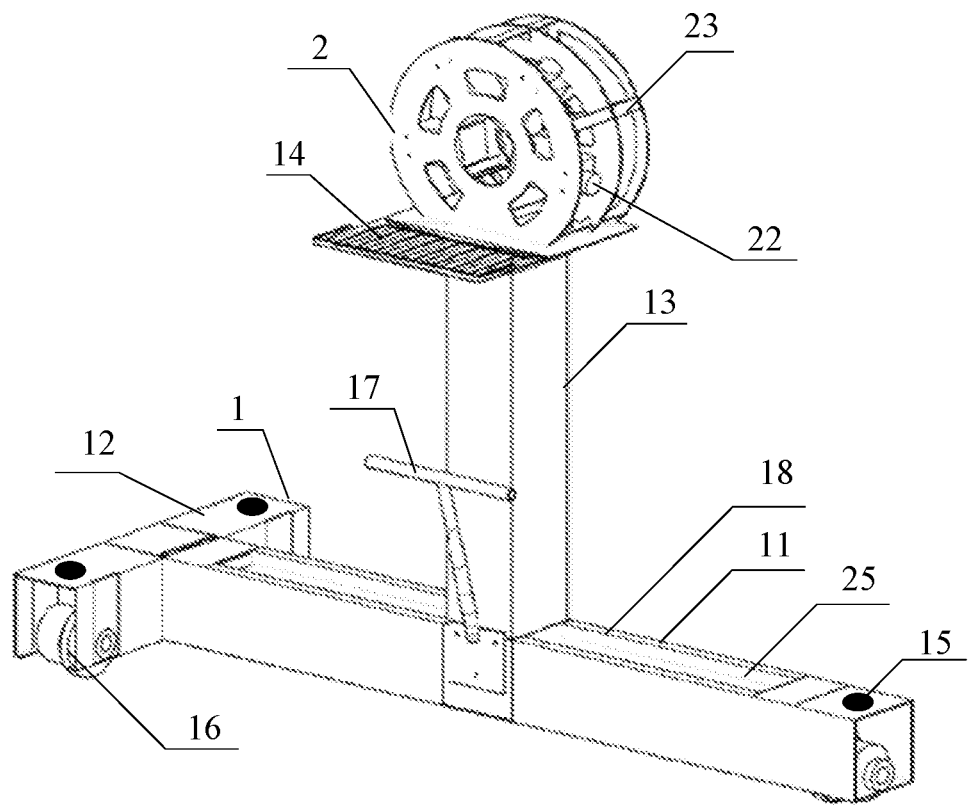
FIG. 1 is a structural view of the present invention.

As shown in FIG. 1, a system for quickly detecting tunnel deformation includes a rail walking mechanism 1 and an acquisition system 2. The rail walking mechanism 1 is disposed on the subway rail. The rail walking mechanism 1 is a T-shaped walking platform, including a cross shaft 11, a longitudinal shaft 12 and a stand column 13; the cross shaft 11 and the longitudinal shaft 12 are connected via a sliding chute to form the T-shaped platform; and the cross shaft 11 and the upper surface of the longitudinal shaft 12 are positioned on the same plane. Three tread wheels 16 are disposed at the bottom of the T-shaped platform. One end of the stand column 13 is vertically connected with the cross shaft 11 via an inserting slot, and the other end of the stand column is used for configuring an operating platform 14 of the acquisition system 2. The upper surfaces of three ends of the T-shaped platform are respectively provided with correlated coordinate marks 15 for establishing a correlated coordinate plane. The cross shaft 11 is provided with a push handle 17.

The acquisition system 2 includes a fractional laser structured light source 21, industrial focus-fixed cameras 22, a computer, an annular support frame 23, a control card 24, a power supply 25, a data exchanger 26 and an encoder. The annular support frame 23 is disposed on the operating platform 14. The fractional laser structured light source 21, the industrial focus-fixed cameras 22 and the control card 24 are fixed on the annular support frame 23; the power supply 25 and the encoder are disposed in the cross shaft 11. The power supply 25 is respectively connected with the encoder, the industrial focus-fixed cameras 22, the control card 24 and the data exchanger 26 to realize the power supply. The control card 24 is connected with the encoder and the industrial focus-fixed cameras 22. The industrial focus-fixed cameras 22 are connected with the computer via the data exchanger 26.

The annular support frame 23 plays a role on fixing all components at the acquisition system. The industrial focus-fixed cameras 22 are mainly used for photographing image information on the tunnel structure with the lighting of the fractional laser device. The encoder works in a way of rotating to generate electronic pulses and transmitting the electronic pulses to the control card 24. The control card 24 is internally written with control programs, collecting the electronic pulses generated by the encoder and making judgments. If the electronic pulses reach the judgment criteria set by the control program, the control card sends a trigging pulse signal to the industrial focus-fixed cameras, providing the triggering signal of the industrial focus-fixed cameras 22. The data exchanger 26 collects and transmits the image information acquired by the industrial focus-fixed cameras 22. The power supply 25 provides the control card 24 and the encoder with working power, and stores the tunnel image information which is acquired by the industrial focus-fixed cameras 22 and transmitted by the data exchanger 26.

Figure 2:
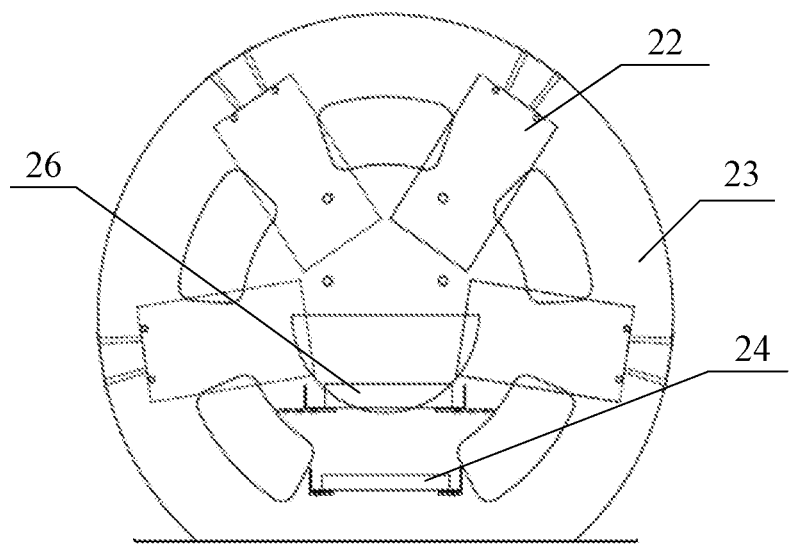
FIG. 2 is a schematic view of the arrangements of industrial focus-fixed cameras of the present invention.
Figure 3:
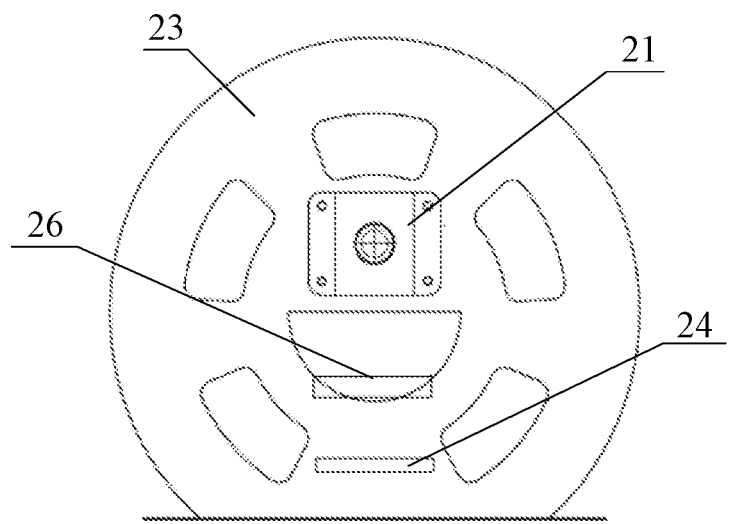
FIG. 3 is a schematic view of the arrangements of a fractional laser device of the present invention.

As shown in FIG. 2, in this embodiment, four industrial focus-fixed cameras 22 are provided, arranged in turn along the annular edge of the annular support frame 23. The annular distribution of the industrial focus-fixed cameras 22 at the annular support frame 23 must be fixed; and the industrial focus-fixed cameras 22 are fixed for the purpose of accurately positioning the annular angle of the image information in the tunnel photographed by the industrial focus-fixed cameras 22. The fractional laser structured light source 21 is a fractional laser device, and one light source is provided.

The cross shaft 11 is provided with a groove 18 for placing the power supply 25 and the encoder. The power cords of the power supply 25 and the signal wires of the encoder are disposed in the groove 18 and the stand column 13. The encoder is placed at the end of the cross shaft 11, is in non-differential connection with the tread wheels 16 on the cross shaft 11, and rotates along with the tread wheels 16 of the cross shaft 11.

The stand column 13 is connected with the cross shaft 11 via an inserting slot; and the annular support frame 23 is connected with the operating platform 14 via an inserting slot. The cross shaft 11 is provided with plugs in the slot; the stand column 13 is provided with plugs at two ends; and the annular support frame 23 is provided with plugs at the bottom. The stand column 13 is integrally provided with a lead-connecting two-way plug; the plugs of the cross shaft 11, the stand column 13 and the annular support frame 23 all have power cord jacks for connecting the power supply 25 and the signal wire jacks for connecting the encoder 5. The cross shaft 11 communicates with the power supply 25 and the encoder when connecting with the stand column 13 through the inserting slot. The operating platform 14 communicates with the power supply 25 and the encoder when connecting with the annular support frame 23 through the inserting slot.

In this embodiment, an exemplary dimensions of the parts in the device are as follow. The cross shaft is 1,460 mm high and has a cross section with the size of 146 mm W×150 mmH with one end equipped with the tread wheel with a shaft. The longitudinal shaft is 600 mm high and has a cross section with the size of 146 mmW×160 mmH and two ends equipped with the tread wheels with shafts, where the distance between the wheel centers is 450 mm. The stand column is 815 mm high and has a square cross section with the size of 140 mm×140 mm; the two ends of the stand column are respectively provided with inserting sliding chutes which are 50 mm long, and the sliding chutes are distributed on two opposite faces, one face with an odd number of sliding chutes and the other face with an even number of sliding chutes. The annular support frame has an outer diameter of 400 mm.

Figure 5:
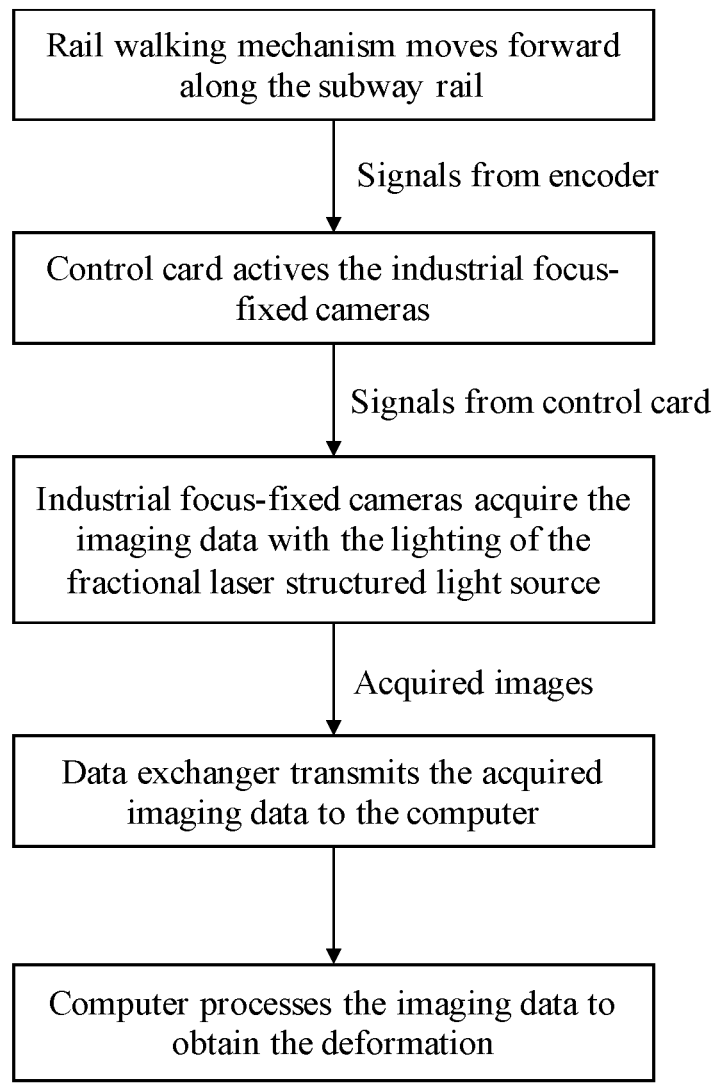
FIG. 5 is a schematic of working process of the system.

The working principle of the device is as follows. When the rail walking mechanism 1 moves forward along the subway rail, the control card 24 actives the industrial focus-fixed cameras 22 according to the electronic pulses of the encoder; the industrial focus-fixed cameras 22 acquire the imaging data of the subway rail with the lighting of the fractional laser structured light source 21; the data exchanger 26 transmits the acquired imaging data to the computer; and the computer acquires and processes the imaging data to obtain the deformation of the cross section of the subway tunnel structure. This working process is shown in FIG. 5.

Figure 4:
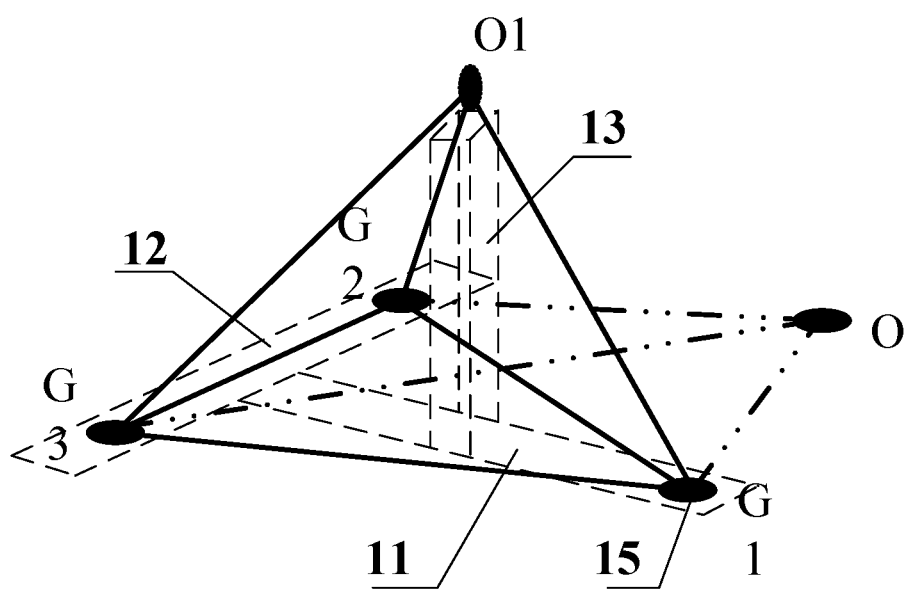
FIG. 4 is a schematic view of the coordinate transformation of the present invention.
Figure 6:
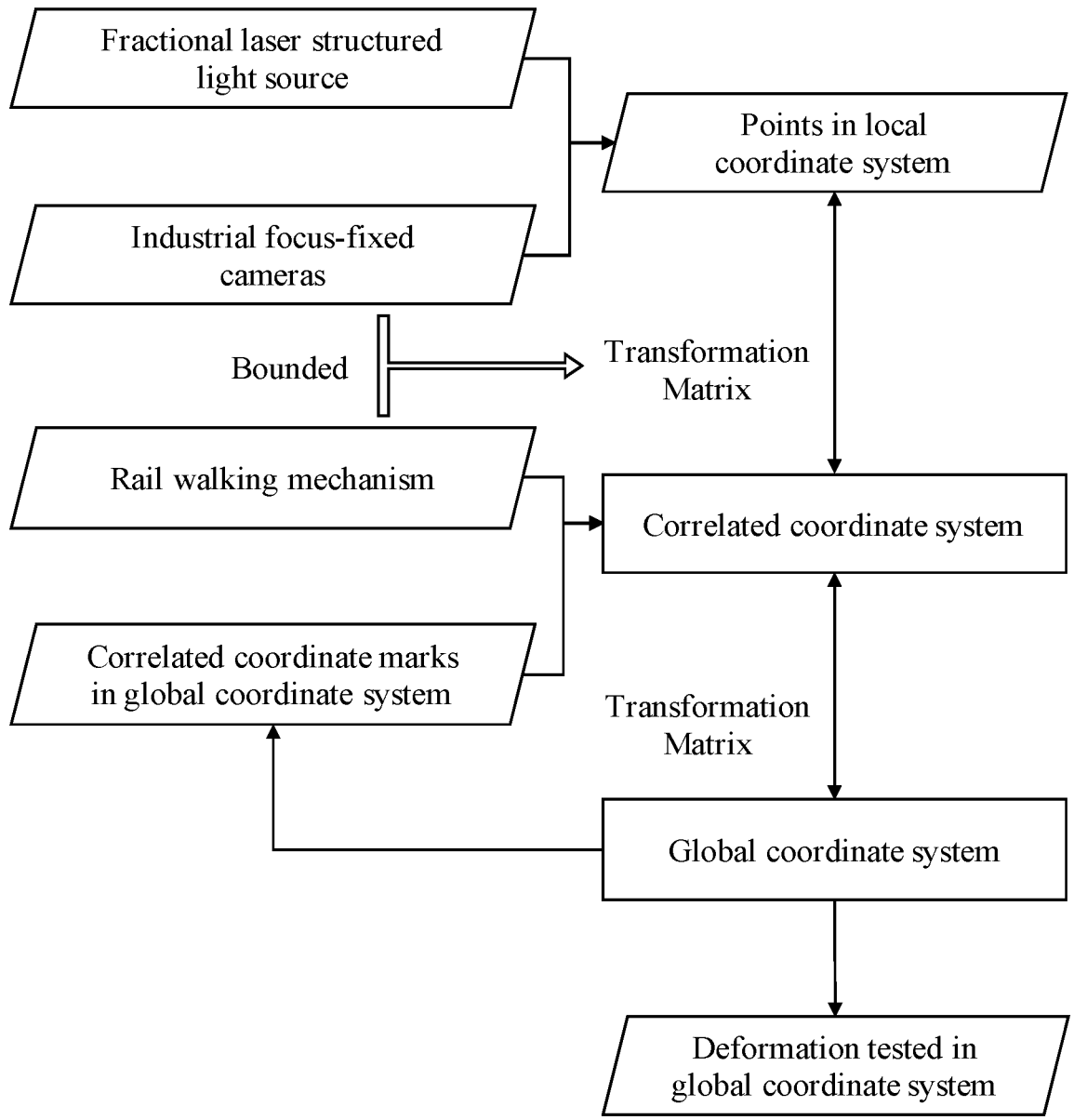
FIG. 6 is a schematic of coordinate transformation process of the system.

During the processing of the imaging data to obtain the deformation of the cross sections of the subway tunnel structure, a coordinate transformation is implemented in the following way: the fractional laser structured light source 21 and the industrial focus-fixed cameras 22 work together to construct a local three-dimensional coordinate system of the cross section deformation of the subway tunnel structure; the rail walking mechanism 1 and the correlated coordinate marks 15 thereon cooperate to construct a correlated coordinate system; points in the local three-dimensional coordinate system are transformed into a global three-dimensional coordinate system by the correlated coordinate system; and the deformation of cross sections of the subway tunnel structure is tested in the global three-dimensional coordinate system. The specific logic relationship of the coordinate transformation is as shown in FIG. 4, and the coordinate transformation process is shown in FIG. 6.

O is a point in the global coordinate system (usually the ground coordinate system) in the subway tunnel; G1 is a coordinate correlation mark at an end of the tread wheel fixed at the cross shaft 11; G2 and G3 are coordinate correlation marks at two ends of the tread wheel fixed at the cross shaft 12; and O1 is a virtual original point of the local three-dimensional coordinate system generated by the industrial focus-fixed cameras 22 and the fractional laser structured light source. O is a known coordinate. The length relationship and the space relationship of the G1G2, G2G3 and G1G3 are known at the completion of the device manufacturing, and G1, G2 and G3 form three lines on the same plane. The space coordinates of the G1, G2 and G3 can be determined by measuring the length and angle relationships of OG1, OG2 and OG3. The conversion coefficients of the space coordinates from the global original point O to G1, G2 and G3 are only based on the lengths and angles among the OG1, OG2 and OG3, and fixed conversion coefficients can be generated. O1 is the virtual original point of the local three-dimensional coordinate system. By marking the relationships of the O1, G1, G2 and G3, fixed coordinate transformation coefficients can be obtained. Therefore, each time before the device is employed to measure and test the cross section deformation of a tunnel structure, the space coordinates of G1, G2 and G3 can be known by taking the point O of the known coordinate system (usually the ground coordinate system) in the subway tunnel and measuring the lengths and angles among of OG1, OG2 and OG3, and thus O1 and the global space coordinates, which takes the O1 as the partial coordinate original point of the tunnel structure can be known.

The present invention aims to solve the problem with detecting cross section deformation of the subway tunnel structure. The device and concept thereof of the present invention can also be applied to the testing working and device research and development in other fields.

Therefore, those skilled in the art can easily make various amendments to the devices and apply the general principle described here to other embodiments without inventive work. For example, the acquisition devices, working process and coordinate transformation process of this invention can be easily applied in road tunnels or railway tunnels with various simple modifications which cannot be regarded as inventive work. Therefore, the present invention is not limited to the above embodiments. All improvements and amendments made by those skilled in the art according to the enlightenment of the present invention shall fall within the protective scope of the present invention.

What is claimed is:

1. A system for quickly detecting tunnel deformation, comprising:

a rail walking mechanism disposed on a subway rail; and
an acquisition system disposed on the rail walking mechanism;
wherein the rail walking mechanism is a T-shaped walking platform, comprising a cross shaft, a longitudinal shaft and a stand column; the cross shaft and the longitudinal shaft are connected to form the T-shaped platform; tread wheels are disposed at the bottom of the T-shaped platform; one end of the stand column is vertically connected with the cross shaft, and the other end of the stand column is used for configuring an operating platform of the acquisition system;
the acquisition system comprises a fractional laser structured light source, industrial focus-fixed cameras and a computer, the computer being connected with the industrial focus-fixed cameras;
when the rail walking mechanism moves forward along a subway rail, the industrial focus-fixed cameras acquire imaging data of the subway rail with the lighting of the fractional laser structured light source and transmit the imaging data to the computer; and the computer receives and processes the imaging data to obtain the deformation of the cross sections of the subway tunnel structure,
wherein the T-shaped platform is configured to ensure three points in contact with the subway rail being on a same plane,
wherein the fractional laser structured light source is a fractional laser device,
wherein during the processing of the imaging data to obtain the deformation of the cross sections of the subway tunnel structure, coordinate transformation is implemented by the following way:
the fractional laser structured light source and the industrial focus-fixed cameras work together to construct a partial three-dimensional coordinate system of the cross section deformation of the subway tunnel structure, the rail walking mechanism and correlated coordinate marks thereon cooperate to construct a correlated coordinate system; points in the partial three-dimensional coordinate system are transformed into a global three-dimensional coordinate system by the correlated coordinate system; and the deformation of the cross sections of the subway tunnel structure is tested in the global three-dimensional coordinate system.

2. The system for quickly detecting tunnel deformation according to claim 1, wherein the cross shaft and the longitudinal shaft are connected through a sliding chute to form the T-shaped platform and the cross shaft and the upper surface of the longitudinal shaft are on the same plane.

3. The system for quickly detecting tunnel deformation according to claim 1, wherein the upper surfaces of three ends of the T-shaped platform are respectively provided with the correlated coordinate marks for establishing a correlated coordinate plane.

4. The system for quickly detecting tunnel deformation according to claim 1, wherein the acquisition system also comprises an annular support frame, a control card, a power supply, a data exchanger and an encoder; the annular support frame is disposed on the operating platform; the fractional laser structured light source, the industrial focus-fixed cameras and the control card are fixed on the annular support frame; the power supply and the encoder are disposed in the cross shaft; the power supply is respectively connected with the encoder, the industrial focus-fixed cameras, the control card and the data exchanger; the control card is respectively connected with the encoder and the industrial focus-fixed cameras; and the industrial focus-fixed cameras are connected with the computer via the data exchanger;

the control card activates the industrial focus-fixed cameras according to the electronic pulses of the encoder; the industrial focus-fixed cameras acquire the imaging data of the subway rail with the lighting of the fractional laser structured light source; and the data exchanger transmits the acquired imaging data to the computer.

5. The system for quickly detecting tunnel deformation according to claim 4, wherein a plurality of industrial focus-fixed cameras are disposed, arrayed in turn along the annular edge of the annular support frame; and the fixing positions of the industrial focus-fixed cameras correspond to the annular angles of the image information, photographed by the industrial focus-fixed cameras in the tunnel.

6. The system for quickly detecting tunnel deformation according to claim 4, wherein the cross shaft is provided with a groove for placing the power supply and the encoder; and the power cords of the power supply and signal wires of the encoder are hidden in the groove and in the stand column.

7. The system for quickly detecting tunnel deformation according to claim 4, wherein the stand column is connected with the cross shaft via an inserting slot; and the annular support frame is connected with the operating platform via an inserting slot.

8. The system for quickly detecting tunnel deformation according to claim 1, wherein the cross shaft is provided with a push handle.

* * * * *